(12) United States Patent
Hashimoto (10) Patent No.: US 9,726,226 B2
(45) Date of Patent: Aug. 8, 2017

(54) CROSS SHAFT JOINT AND STEERING DEVICE FOR VEHICLE USING THE SAME

(71) Applicant: JTEKT CORPORATION, Osaka-shi, Osaka (JP)

(72) Inventor: Kenichi Hashimoto, Oume (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/760,609

(22) PCT Filed: Jan. 17, 2014

(86) PCT No.: PCT/JP2014/050768
§ 371 (c)(1),
(2) Date: Jul. 13, 2015

(87) PCT Pub. No.: WO2014/112576
PCT Pub. Date: Jul. 24, 2014

(65) Prior Publication Data
US 2016/0003306 A1    Jan. 7, 2016

(30) Foreign Application Priority Data

Jan. 21, 2013 (JP) .................................. 2013-008509

(51) Int. Cl.
| | |
|---|---|
| *F16D 3/38* | (2006.01) |
| *B62D 1/20* | (2006.01) |
| *F16D 3/41* | (2006.01) |

(52) U.S. Cl.
CPC .............. *F16D 3/385* (2013.01); *B62D 1/20* (2013.01); *F16D 3/41* (2013.01)

(58) Field of Classification Search
CPC .............. F16D 3/385; F16D 3/41; B62D 1/20
See application file for complete search history.

(56) References Cited

U.S. PATENT DOCUMENTS

| | | |
|---|---|---|
| 3,721,110 A | 3/1973 | Borneman |
| 4,553,858 A | 11/1985 | Neugebauer et al. |
| | (Continued) | |

FOREIGN PATENT DOCUMENTS

| | | |
|---|---|---|
| CN | 102812259 A | 12/2012 |
| DE | 33 37 602 A1 | 4/1985 |
| | (Continued) | |

OTHER PUBLICATIONS

Apr. 1, 2014 International Search Report issued in Application No. PCT/JP2014/050768.

(Continued)

*Primary Examiner* — Faye M Fleming
(74) *Attorney, Agent, or Firm* — Oliff PLC (57) ABSTRACT

A cross shaft joint includes a cross shaft including four shaft parts, needle rollers rolling on outer peripheral faces of the shaft parts, bearing cups each having a cylindrical part, and a bottom part, and externally fitted to the shaft parts via the needle rollers, and yokes provided with bearing holes into which the bearing cups are inserted. The needle rollers are maintained in a tight fit state between the shaft parts and the bearing cups. Each cylindrical part is provided with a projected part projected radially inward of the cylindrical part in a curved shape, at an inner peripheral side thereof, and an apex of the projected part is in contact with the needle roller within a range in an axial direction of the needle roller, the range containing an axial center of the needle roller in the axial direction.

10 Claims, 5 Drawing Sheets

(56) References Cited

U.S. PATENT DOCUMENTS

| | | | |
|---|---|---|---|
| 4,893,962 A * | 1/1990 | Komeyama | F16D 1/033 |
| | | | 403/288 |
| 7,192,356 B2 * | 3/2007 | Komeyama | F16D 3/38 |
| | | | 464/127 |
| 7,682,254 B2 * | 3/2010 | Araki | F16D 3/385 |
| | | | 464/128 |
| 2002/0110301 A1 | 8/2002 | Niina | |
| 2013/0237330 A1 | 9/2013 | Higuchi et al. | |
| 2015/0275981 A1 * | 10/2015 | Kobayashi | F16D 3/385 |
| | | | 29/898.06 |

FOREIGN PATENT DOCUMENTS

| | | | | |
|---|---|---|---|---|
| GB | 2101271 A | | 1/1983 | |
| JP | H07-119740 A | | 5/1995 | |
| JP | H08-174352 A | | 7/1996 | |
| JP | 2005351401 A | * | 12/2005 | F16D 3/41 |
| JP | 2006-046560 A | | 2/2006 | |
| JP | 2007-309340 A | | 11/2007 | |
| JP | 2007-327590 A | | 12/2007 | |
| JP | 2009-024762 A | | 2/2009 | |
| JP | 2010-071457 A | | 4/2010 | |
| JP | 2010071457 A | * | 4/2010 | F16D 3/41 |

OTHER PUBLICATIONS

Sep. 6, 2016 Search Report issued in European Patent Application No. 14740512.0.

Sep. 13, 2016 Office Action issued in Japanese Patent Application No. 2013-008509.

Dec. 27, 2016 Office Action issued in Chinese Patent Application No. 201480005561.9.

* cited by examiner

CROSS SHAFT JOINT AND STEERING DEVICE FOR VEHICLE USING THE SAME

TECHNICAL FIELD

The present invention relates to a cross shaft joint and a steering device for a vehicle using the same.

BACKGROUND ART

There has been a steering device for a vehicle for conducting steering of wheels of an automobile or the like, which includes a column shaft to which a steering wheel is mounted, a steering shaft for steering the wheels for steering by way of a steering mechanism such as a steering gear box, and a cross shaft joint for tiltably coupling the column shaft and the steering shaft to each other.

The cross shaft joint which is used in the steering device for a vehicle includes a cross shaft having four shaft parts which are protruded from side peripheral faces of a body part thereof in four directions in a shape of a cross, a plurality of needle rollers rolling on outer peripheral faces of the shaft parts, and bearing cups having a bottomed cylindrical shape which are externally fitted to these needle rollers. The bearing cups are inserted into bearing holes in yokes which are respectively provided in the column shaft and the steering shaft, thereby allowing the shaft parts to rotate with respect to the yokes. By coupling the yokes of the two shafts to each other byway of the cross shaft, as described above, this cross shaft joint tiltably couples the two shafts.

In the cross shaft joint as described above, it has happened, in some cases, that when a transmitted torque grows larger, slips occur in the needle rollers, and faulty torque transmission such as backlashes, pulsations occurs, which badly affects steering feeling of the relevant steering device for a vehicle. In view of the above, there is disclosed, in the below mentioned Patent Document 1, an art that each of the bearing cups is provided with a curved part which is curved to project radially inward, in a center part in an axial direction of the cylindrical part thereof, and each of the needle rollers is elastically pressed radially inward by this curved part so that the needle roller is maintained in tight fit state (state of a negative gap) with respect to the shaft part.

PRIOR ART DOCUMENT

Patent Document

Patent Document 1: JP-A-2007-327590

SUMMARY OF THE INVENTION

Problems that the Invention is to Solve

In the art of the above described Patent Document 1, the needle roller is pressed against the shaft part by elastic deformation of the curved part of the bearing cup. Therefore, when an excessive load is applied to the cross shaft joint, the curved part is curved outward in a radial direction thereby to moderate a stress. As the results, deterioration of durability can be advantageously restrained.

Figure 5:
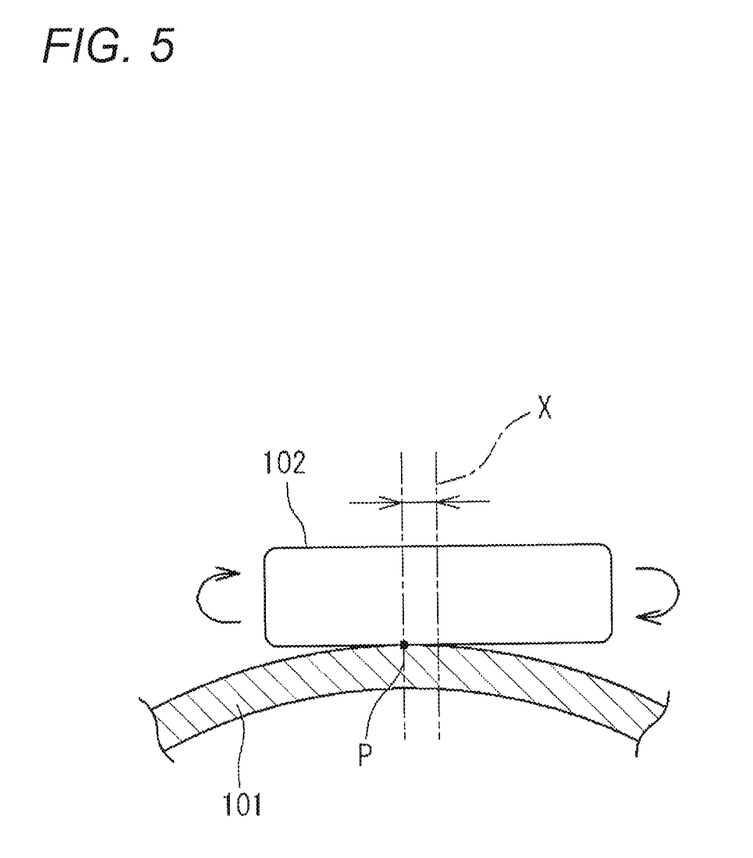
FIG. 5 is an explanatory view showing the prior art.

However, as shown in FIG. 5, a curved part 101 of the bearing cup is brought into substantially point contact with respect to a needle roller 102, and a position P of the point contact is displaced from a center position X in an axial direction (a longitudinal direction) of the needle roller. Accordingly, a skew is likely to occur in the needle roller 102 around the point contact position P, and this skew has been a cause for torque fluctuation in the cross shaft joint. Moreover, the torque fluctuation caused by the skew is increased, as a radial gap of the needle roller is reduced.

This invention has been made in view of the above described circumstances, and it is an object of the invention to provide a cross shaft joint in which occurrence of a skew can be restrained, while a radial gap (a negative gap) of a needle roller inside a bearing cup can be sufficiently reduced, and to provide a steering device for a vehicle using the same.

Means for Solving the Problems (1) According to the invention, there is provided a cross shaft joint comprising: a cross shaft including four shaft parts which are arranged in a shape of a cross; a plurality of needle rollers rolling on outer peripheral faces of the respective shaft parts; bearing cups each having a cylindrical part, and a bottom part for closing an opening at one end side of the cylindrical part; the bearing cups externally fitted to the shaft parts via the needle rollers; and yokes provided with bearing holes into which the bearing cups are inserted, wherein the needle rollers are maintained in a tight fit state between the shaft parts and the bearing cups, characterized in that each of the cylindrical parts is provided with a projected part which is projected radially inward of the cylindrical part in a curved shape, at an inner peripheral side thereof, and an apex of the projected part is in contact with the needle roller within a range in an axial direction of the needle roller, the range containing an axial center of the needle roller in the axial direction.

According to the above described structure of the invention, the apex of the projected part which is formed in the cylindrical part of the bearing cup is in contact with the needle roller within the range in the axial direction containing the axial center of the needle roller. Therefore, it is possible to favorably suppress the skews of the needle rollers, and also to restrain the torque fluctuation attributed to these skews.

(2) In the cross shaft joint according to the invention, it would be preferable that a height h of the projected part within a range in the axial direction, the range a center of which is the apex of the projected part, and which corresponds to 60 to 70% of a length of the needle roller, is set to be 0<h≤0.005 mm.

By adopting such a structure, it is possible to equalize contact surface pressure between the needle roller and the cylindrical part of the bearing cup, and at the same time, to suppress a peak of the contact surface pressure. As the results, abrasion and damage of the needle roller and the bearing cup can be restrained, and the durability can be enhanced.

(3) In the cross shaft joint according to the invention, it would be preferable that a radial gap s of the needle roller inside the bearing cup is set to be −0.03 mm≤s<0.

In case where the radial gap of the needle roller is extremely small (for example, −0.03 mm to −0.02 mm), the torque fluctuation is extremely increased, in the conventional cross shaft joint, to be inappropriate for practical use. However, in this invention, it is possible to favorably suppress the skew of the needle roller, even in case of such a small radial gap.

(4) According to the invention, there is provided a steering device for a vehicle, the steering device comprising: a column shaft to which a steering wheel is mounted; a steering shaft for steering wheels for steering by way of a steering mechanism; and a cross shaft joint which is interposed between the column shaft and the steering shaft for tiltably coupling the column shaft and the steering shaft to each other, characterized in that the cross shaft joint is the cross shaft joint as described in any one of the above items (1) to (3).

Advantage of the Invention

According to the invention, it is possible to restrain occurrence of the skews of the needle rollers, while enabling the radial gaps of the needle rollers to be sufficiently reduced.

MODE FOR CARRYING OUT THE INVENTION

Now, an embodiment of the invention will be described referring to the drawings.

Figure 1:
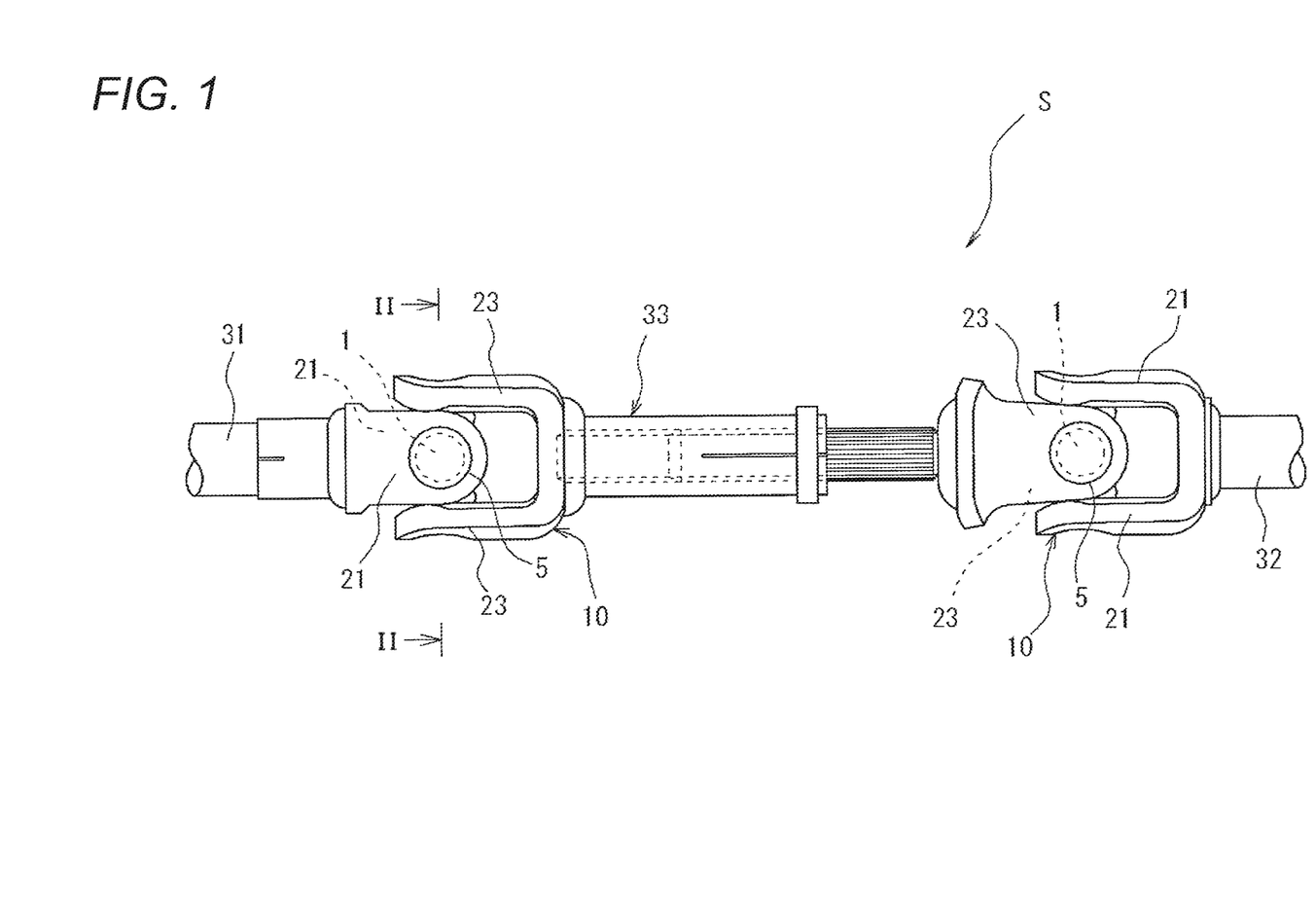
FIG. 1 is a side view showing a structure of an essential part of a steering device for a vehicle in an embodiment according to the invention.

FIG. 1 is a side view showing a structure of an essential part of a steering device for a vehicle in an embodiment according to the invention.

A steering device S for a vehicle is a device for steering wheels for steering of a vehicle such as an automobile. The steering device S includes a column shaft 32 to which a steering wheel (not shown) of the vehicle is integrally and rotatably mounted, a steering shaft 31 for steering the wheels for steering by way of a steering gear box or the like, an intermediate shaft 33 interposed between the two shafts 31 and 32, and cross shaft joints 10 which are provided respectively between the steering shaft 31 and the intermediate shaft 33, and between the column shaft 32 and the intermediate shaft 33 so as to tiltably couple these shafts. In short, the cross shaft joints 10 are interposed between the steering shaft 31 and the column shaft 32, and tiltably couples the two shafts 31, 32.

The above described cross shaft joints 10 will be described below.

The cross shaft joint 10 which is provided between the steering shaft 31 and the intermediate shaft 33 has a pair of yokes 21 which are opposed to each other and fixed to an end part of the steering shaft 31, a pair of yokes 23 which are assembled to these yokes 21 and fixed to an end part of the intermediate shaft 33, and a cross shaft 1 which is mounted via bearing cups 5 and so, which will be described below, for coupling the yokes 21 and 23.

Moreover, the cross shaft joint 10 which is provided between the column shaft 32 and the intermediate shaft 33 also has, in the same manner as described above, a pair of yokes 21 which are opposed to each other and fixed to an end part of the column shaft 32, a pair of yokes 23 which are fixed to an end part of the intermediate shaft 33, and a cross shaft 1 for coupling the yokes 21 and 23 via bearing cups 5 and so on.

Figure 2:
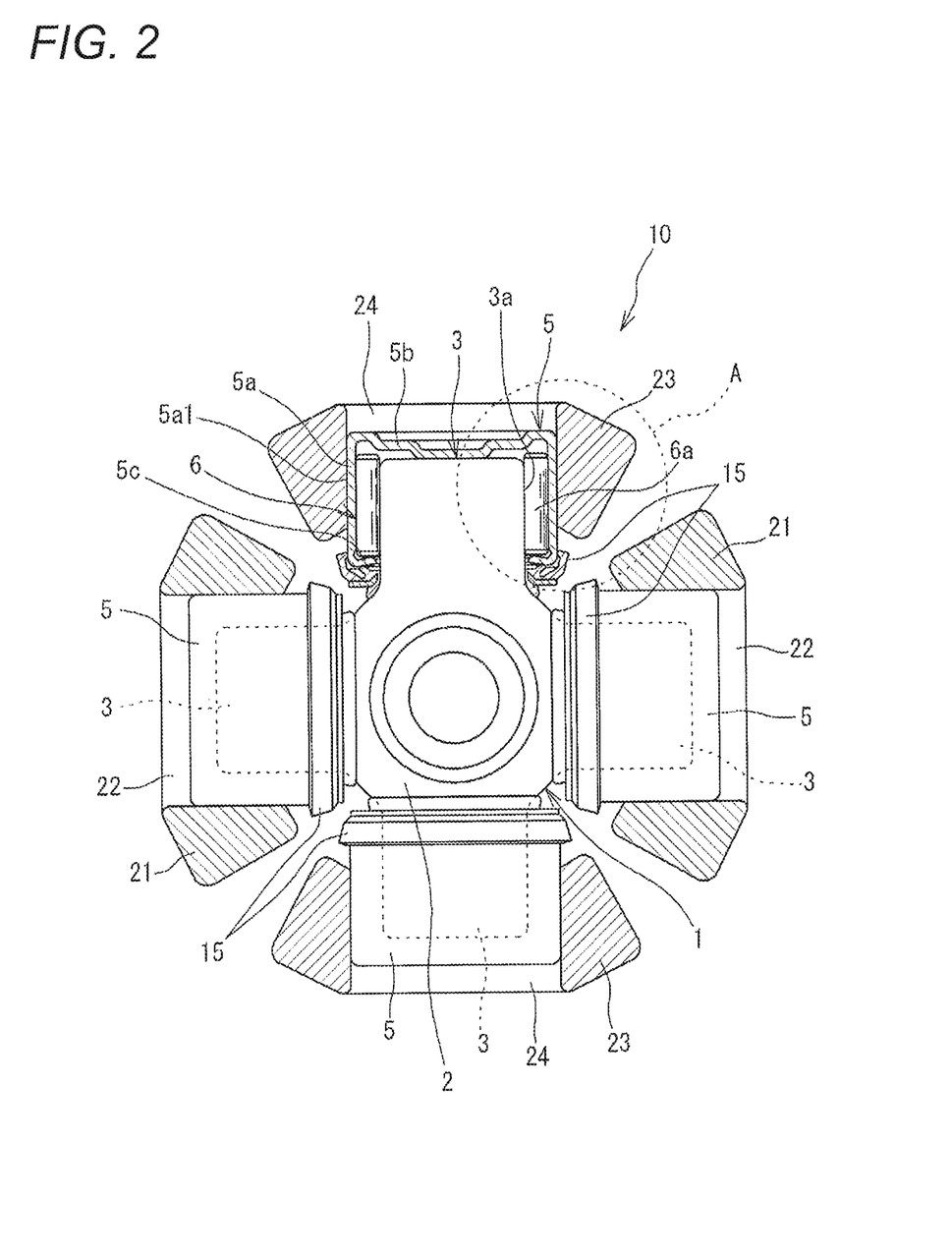
FIG. 2 is a sectional view as seen in a direction of arrows on a line II-II in FIG. 1.

FIG. 2 is a sectional view as seen in a direction of arrows on a line II-II in FIG. 1. A pair of the yokes 21 which are fixed to the steering shaft 31 are provided with bearing holes 22 having the same axis, in respective end parts thereof. Moreover, a pair of the yokes 23 which are fixed to the intermediate shaft 33 are also provided with bearing holes 24 having the same axis, in respective end parts thereof.

The cross shaft 1 has a body part 2, and four shaft parts 3 which are projected in a shape of a cross from a side peripheral face of this body part 2 in four directions. The cross shaft 1 is formed of steel, and the body part 2 and the four shaft parts 3 are integrally molded by forging or so. A plurality of needle rollers 6 are arranged along outer peripheral faces 3a of the shaft parts 3 of the cross shaft 1 so as to roll on the relevant outer peripheral faces 3a. Further, the bearing cups 5 having a bottomed cylindrical shape are externally fitted to the shaft parts 3 via the needle rollers 6.

The bearing cups 5 are formed of steel sheet by stamping or so. Each of the bearing cups 5 is formed in a bottomed cylindrical shape, having a cylindrical part 5a into which the shaft part 3 is inserted via a plurality of the needle rollers 6 which are arranged on the inner peripheral side, and a bottom part 5b for closing an opening of the cylindrical part 5a at one end thereof. The needle rollers 6 which are interposed between the bearing cup 5 and the shaft part 3 are formed of bearing steel or the like, and disposed between the bearing cup 5 and the shaft part 3 so as to roll, allowing their outer peripheral faces 6a to function as rolling contact surfaces. In an end part of the cylindrical part 5a, a folded part 5c for maintaining an axial position of the needle rollers 6 is formed, and at the same time, a seal member 15 for sealing an opening between this folded part 5c and the outer peripheral face 3a of the shaft part 3 is provided.

The bearing cups 5 are respectively press-fitted into the bearing holes 22, 24 of the yokes 21, 23, in a state externally fitted to the shaft parts 3. Specifically, the shaft parts 3 are inserted into the bearing holes 22, 24 of the yokes 21, 23 via the bearing cups 5 and the needle rollers 6 which are arranged on the inner peripheral side of the bearing cups 5 so as to roll. The shaft parts 3 are rotatably supported with respect to the yokes 21, 23.

It is to be noted that the cross shaft joint 10 which is provided between the column shaft 32 and the intermediate shaft 33 has also the substantially same structure as described above, and therefore, description of the same is omitted.

Figure 3:
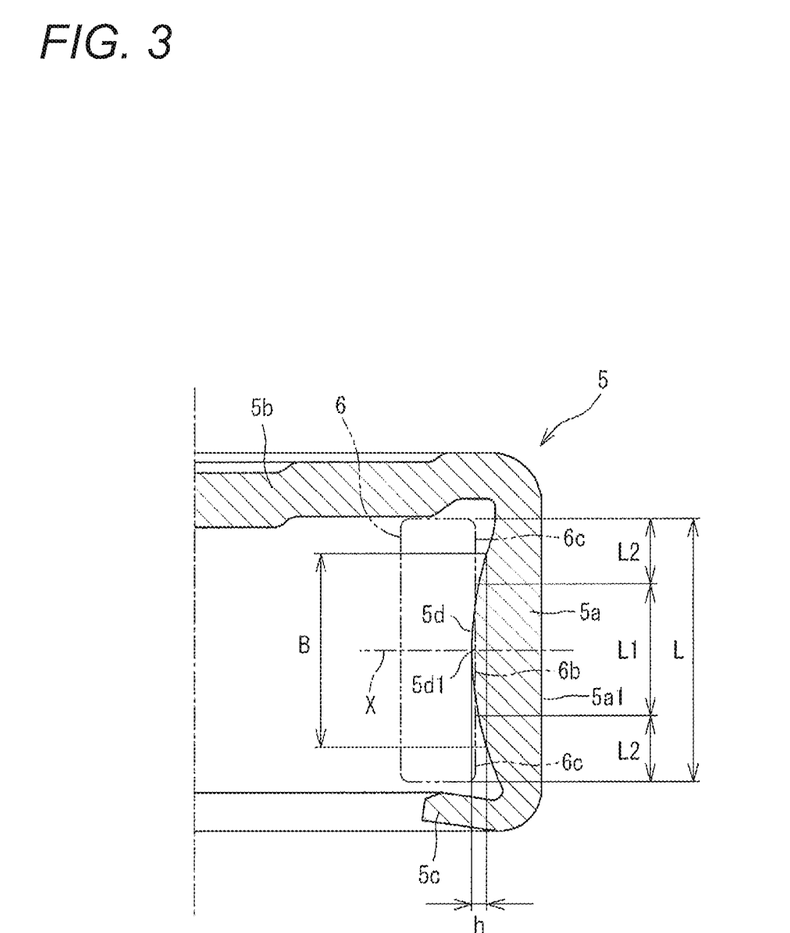
FIG. 3 is an enlarged view of a bearing cup in an encircled part A in FIG. 2.

FIG. 3 is an enlarged view of the bearing cup in an encircled part A in FIG. 2. In FIG. 3, it is to be noted that a height h of a projected part 5d, which will be described below, is shown in an exaggerated manner for enabling the description to be easily understood.

As shown in FIG. 3, the projected part 5d projecting radially inward in a curved shape (in an arc shape) is formed on the inner peripheral face of the cylindrical part 5a of the bearing cup 5. On the other hand, an outer peripheral face 5a1 of the cylindrical part 5a is formed in a substantially rectilinear shape in section. Therefore, the cylindrical part 5a of the bearing cup 5 has the largest wall thickness in a substantially center part in an axial direction (an apex 5d1 of the projected part 5d), and the smallest wall thickness at both sides of the center part in the axial direction. However, in this embodiment too, the outer peripheral face 5a1 of the cylindrical part 5a may be formed in a concave curved shape, in the same manner as in the prior art (Refer to Patent Document 1).

The projected part 5d has a prescribed height h in a predetermined range B, a center of which is the apex 5d1, in the axial direction. This range B corresponds to 60 to 70% of a length L of the needle roller 6. The height h of the projected part 5*d* in the relevant range B is set to be 0<h≤0.005 mm. Moreover, in a state where the cross shaft joint 10 is assembled, the apex 5*d*1 of the projected part 5*d* is in contact with the outer peripheral face 6*a* of the needle roller 6.

Moreover, the needle roller 6 is maintained in a tight fit state with respect to the shaft part 3. Specifically, radial gaps of the needle roller 6 with respect to the outer peripheral face 3*a* of the shaft part 3 inside the bearing cup 5 and with respect to an inner peripheral face of the projected part 5*d* are negative gaps. Further, due to elastic deformation of the needle roller 6 and the projected part 5*d*, the two members are in contact with each other (a linear contact in a sectional view in FIG. 3), keeping a certain width in the axial direction. Moreover, a center X in the axial direction of the needle roller 6 is contained within a contact range between the projected part 5*d* and the needle roller 6. It is to be noted that axial positions of the apex 5*d*1 of the projected part 5*d* and the center X in the axial direction of the needle roller 6 may be aligned with each other, or may be misaligned.

The needle roller 6 is provided with crownings 6*c* at both sides in a longitudinal direction thereof (the axial direction). The outer peripheral face in a center part 6*b* in the longitudinal direction between the two crownings 6*c* is formed in a substantially flat shape in section. A length L2 of the crownings 6*c* which are formed in respective side parts of the needle roller 6 is set to be, for example, about ¼ of a total length L of the needle roller 6. Moreover, a length L1 of the center part (the flat part) 6*b* of the needle roller 6 in the longitudinal direction is set to be about ½ of the total length L of the needle roller 6. The projected part 5*d* which is formed in the cylindrical part 5*a* of the bearing cup 5 is set to have such a shape that the apex 5*d*1 is kept in contact with the flat part 6*b* of the needle roller 6*a*, even though the needle roller 6*a* moves in the axial direction between the bottom part 5*b* and the folded part 5*c*.

In the above described structure, the projected part 5*d* which is projected radially inward in a curved shape is provided at the inner peripheral side of the cylindrical part 5*a* of the bearing cup 5, and the needle roller 6 is in contact with this projected part 5*d* within an axial range containing the center X in the axial direction of the relevant needle roller 6. Therefore, the needle roller 6 is unlikely to skew, even in case where the radial gap (the negative gap) of the needle roller 6 is reduced, and hence, fluctuation of the transmitted torque of the cross shaft joint 10 can be restrained. Specifically, provided that a contact position between the projected part 5*d* and the needle roller 6 is axially displaced from the center X in the longitudinal direction (the axial direction) of the needle roller 6, a force for rotating the needle roller 6 around the contact position between the projected part 5*d* and the needle roller 6 (a skew moment) grows larger, when a circumferential force is exerted between the projected part 5*d* and the needle roller 6. However, it is possible to reduce such a skew moment, in this embodiment, because the projected part 5*d* and the needle roller 6 are kept in contact within the axial range containing the center in the longitudinal direction of the needle roller 6.

In the prior art (Refer to Patent Document 1), the cylindrical part 5*a* of the bearing cup 5 is provided with the curved part which is curved inward in a radial direction, and this curved part is formed in a concave shape on the outer peripheral face 5*a*1 of the cylindrical part 5*a*. Therefore, even in case where the radial gap of the needle roller 6 is reduced or radial loads are applied to the bearing cup 5 and the needle roller 6 are increased, an entirety of the curved part is deformed outward in a radial direction, and a contact area between the needle roller 6 and the curved part is not so much enlarged. For this reason, a problem of the skew as described above becomes more noticeable. On the other hand, in this embodiment, the outer peripheral face 5*a*1 of the cylindrical part 5*a* has a rectilinear shape in section, and hence, an entirety of the cylindrical part 5*a* is hardly deformed outward in a radial direction, when the radial gap of the needle roller 6 is reduced or the radial loads applied to the bearing cup 5 and the needle roller 6 are increased. On the contrary, an amount of the elastic deformation in the contact part between the inner peripheral face of the projected part 5*d* and the outer peripheral face 6*a* of the needle roller 6 is increased, and the contact area between the two faces is enlarged. For this reason, it is possible to favorably restrain occurrence of the skew of the needle roller 6.

A test was made on relation between the radial gap and the torque fluctuation both in the prior art (Refer to Patent Document 1) and this embodiment. In case where the radial gap is −24 μm, a value of the torque fluctuation is 0.2 to 0.3 N·m, in the cross shaft joint in the prior art. On the other hand, in the cross shaft joint in this embodiment, a value of the torque fluctuation is 0.1 N·m or less, and it was found that sufficient effects can be obtained.

Figure 4A:
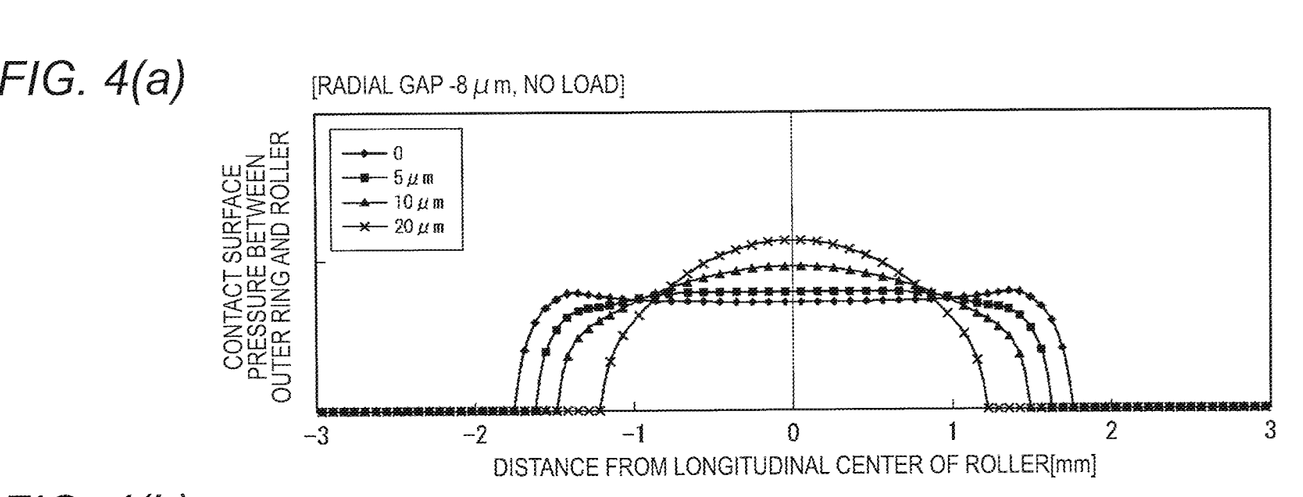
FIGS. 4(a) and 4(b) are graphs showing distribution of surface pressure between a needle roller and the bearing cup.
Figure 4B:
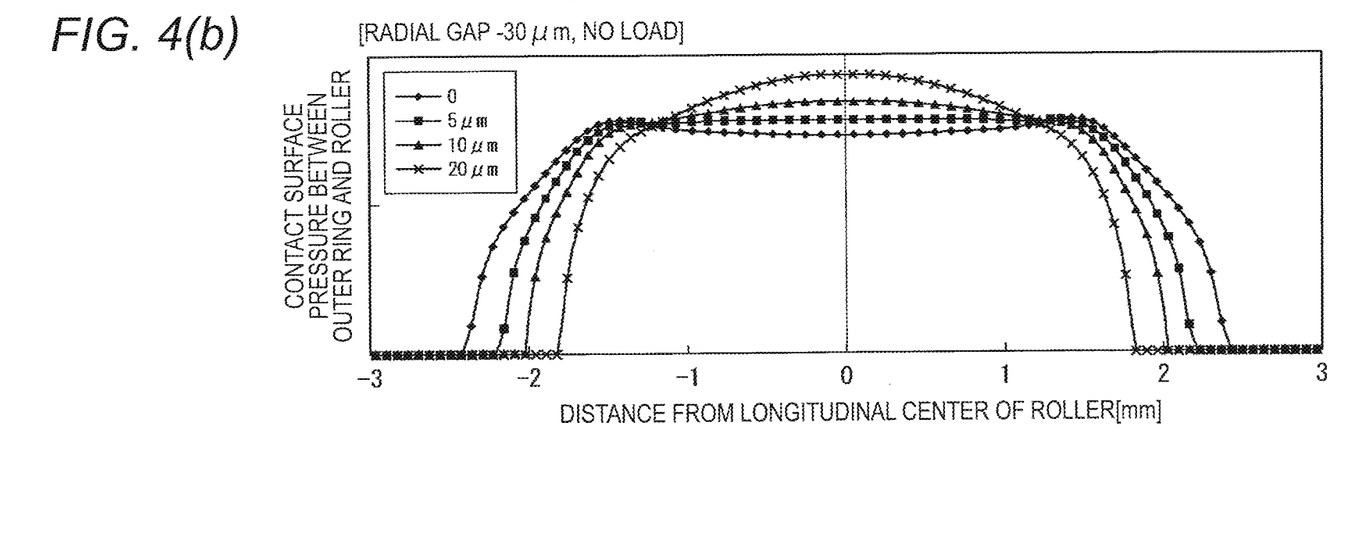

Moreover, in this embodiment, the height h of the projected part 5*d* of the cylindrical part 5*a* within the predetermined range B is set to be 0<h≤0.005 mm, and therefore, it is possible to suppress a peak of the contact surface pressure, while equalizing the contact surface pressure between the needle roller 6 and the cylindrical part 5*a*. This effect will be described referring to FIGS. 4(*a*) and 4(*b*).

FIGS. 4(*a*) and 4(*b*) are graphs showing distribution of surface pressure between the needle roller 6 and the bearing cup 5 (the cylindrical part 5*a*). FIG. 4(*a*) shows a case where the radial gap of the needle roller 6 is −0.008 mm, and FIG. 4(*b*) shows a case where the same radial gap is −0.030 mm. In both cases, the height h of the projected part 5*d* is set to be 0 mm, 0.005 mm (5 μm), 0.010 mm (10 μm), and 0.030 mm (30 μm), and a distance from a longitudinal center of the needle roller 6 is shown on an X-axis, while a magnitude of the surface pressure is shown on a Y-axis.

As apparent from FIGS. 4(*a*) and 4(*b*), in case where the height h of the projected part 5*d* is 10 μm and 30 μm, the peak of the surface pressure appears at the longitudinal center part of the needle roller, and in case where the height h of the projected part 5*d* is 0, the peak of the surface pressure appears at both side positions apart from the longitudinal center part of the needle roller 6. On the contrary, in case where the height h of the projected part 5*d* is 5 μm, it is found that the surface pressure is equalized in a wide range containing the longitudinal center part of the needle roller 6, and that the peak is lowered, as compared with the other cases. Accordingly, it is possible to suppress abrasion of the needle roller 6 and the bearing cup 5, an edge load of the needle roller 6, and so on, thereby to improve durability of the cross shaft joint 10.

The present invention is not limited to the above described embodiment, but the invention can be appropriately modified within a scope of the invention described in the claims.

This application is based on Japanese Patent Application filed on Jan. 21, 2013 (Patent Application No. 2013-008509), the contents of which are hereby incorporated by reference.

INDUSTRIAL APPLICABILITY

According to the invention, it is possible to realize the cross shaft joint in which occurrence of a skew of the needle roller can be suppressed, while enabling the radial gap of the needle roller to be sufficiently reduced, and to realize the steering device for a vehicle using the same.

DESCRIPTION OF THE REFERENCE NUMERALS AND SIGNS

1: Cross shaft, 3: Shaft part, 5: Bearing cup, 5a: Cylindrical part, 5b: Bottom part, 5d: Projected part, 5d1: Apex, 6: Needle roller, 10: Cross shaft joint, 21: Yoke, 22: Bearing hole, 23: Yoke, 24: Bearing hole, S: Steering device for vehicle

The invention claimed is:

1. A cross shaft joint comprising:
a cross shaft including four shaft parts which are arranged in a shape of a cross;
a plurality of needle rollers rolling on outer peripheral faces of the respective shaft parts;
bearing cups each having a cylindrical part, and a bottom part for closing an opening at one end side of the cylindrical part, the bearing cups externally fitted to the shaft parts via the needle rollers; and
yokes provided with bearing holes into which the bearing cups are inserted, wherein the needle rollers are maintained in a tight fit state between the shaft parts and the bearing cups,
wherein:
each of the cylindrical parts is provided with a projected part which is projected radially inward of the cylindrical part in a curved shape, at an inner peripheral side thereof, and an apex of the projected part is in contact with the needle roller within a range in an axial direction of the needle roller, the range containing an axial center of the needle roller in the axial direction, and
an axial center of the cylindrical part has a largest wall thickness.

2. The cross shaft joint according to claim 1, wherein a height h of the projected part within a range in the axial direction, the range a center of which is the apex of the projected part, and which corresponds to 60 to 70% of a length of the needle roller, is set to be 0<h≤0.005 mm.

3. The cross shaft joint according to claim 2, wherein a radial gap s of the needle roller inside the bearing cup is set to be −0.03 mm≤s<0.

4. A steering device for a vehicle, the steering device comprising:
a column shaft to which a steering wheel is mounted;
a steering shaft for steering wheels for steering by way of a steering mechanism; and
a cross shaft joint which is interposed between the column shaft and the steering shaft for tiltably coupling the column shaft and the steering shaft to each other,
wherein the cross shaft joint is the cross shaft joint according to claim 3.

5. A steering device for a vehicle, the steering device comprising:
a column shaft to which a steering wheel is mounted;
a steering shaft for steering wheels for steering by way of a steering mechanism; and
a cross shaft joint which is interposed between the column shaft and the steering shaft for tiltably coupling the column shaft and the steering shaft to each other,
wherein the cross shaft joint is the cross shaft joint according to claim 2.

6. The cross shaft joint according to claim 1, wherein a radial gap s of the needle roller inside the bearing cup is set to be −0.03 mm≤s<0.

7. A steering device for a vehicle, the steering device comprising:
a column shaft to which a steering wheel is mounted;
a steering shaft for steering wheels for steering by way of a steering mechanism; and
a cross shaft joint which is interposed between the column shaft and the steering shaft for tiltably coupling the column shaft and the steering shaft to each other,
wherein the cross shaft joint is the cross shaft joint according to claim 6.

8. A steering device for a vehicle, the steering device comprising:
a column shaft to which a steering wheel is mounted;
a steering shaft for steering wheels for steering by way of a steering mechanism; and
a cross shaft joint which is interposed between the column shaft and the steering shaft for tiltably coupling the column shaft and the steering shaft to each other,
wherein the cross shaft joint is the cross shaft joint according to claim 1.

9. The cross shaft joint according to claim 1, wherein an outer peripheral surface of the bearing cup is planar.

10. The cross shaft joint according to claim 1, wherein the apex of the projected part is in surface contact with the needle roller within a range in an axial direction of the needle roller.

* * * * *